Sept. 25, 1951  A. R. PERKINS  2,569,332
REMOTE-CONTROL ENGINE STARTER
Filed Feb. 2, 1948  4 Sheets-Sheet 2

Alfred R. Perkins
INVENTOR.

Sept. 25, 1951  A. R. PERKINS  2,569,332
REMOTE-CONTROL ENGINE STARTER
Filed Feb. 2, 1948  4 Sheets-Sheet 3

Alfred R. Perkins
INVENTOR.

BY *Clarence A. O'Brien*
*and Harvey B. Jacobson*
Attorneys

Fig. 13.

Alfred R. Perkins
INVENTOR.

Patented Sept. 25, 1951

2,569,332

UNITED STATES PATENT OFFICE 2,569,332

REMOTE-CONTROL ENGINE STARTER

Alfred R. Perkins, East Bridgewater, Mass.

Application February 2, 1948, Serial No. 5,818

12 Claims. (Cl. 290—38)

This invention comprises novel and useful improvements in a remote control engine starter and more specifically pertains to a device whereby the engine of a motor vehicle that is properly parked or positioned in its garage may be started from a remote point, idled until the same is warmed to be thereby conditioned for immediate operation of the vehicle in cold weather.

It is therefore a primary object of the invention to provide a means for starting a motor vehicle engine from a remote point, attended by various safety mechanisms for preventing starting of the engine under improper conditions, whereby a motor vehicle engine may be idled and warmed up until ready for use under cold weather conditions.

A further object of the invention is to provide an apparatus in conformity with the foregoing objects wherein all of the essential operating parts thereof may be compactly held in a casing for convenient mounting within the motor vehicle.

An important feature of the invention resides in the provision of a remote control mechanism for energizing the starting motor of a vehicle engine that is parked in its garage or other customary storage place.

A further feature of the invention resides in the provision of a device as set forth in the preceding paragraph wherein there is provided means for by-passing the ignition switch of the vehicle to thereby establish an operative ignition circuit of the engine for starting the same from a remote point.

Yet another feature of the invention resides in the provision of mechanism as set forth hereinbefore accompanied by safety devices for preventing the operation of the apparatus under various unsafe conditions as when the vehicle is in gear, the garage door is closed, a master control switch in the vehicle is not properly set, and the like.

A further important feature of the invention is the provision of an automatic mechanism for energizing the starting circuit, establishing a secondary ignition circuit for the engine, upon the actuation of a remote control switch; together with suction responsive means for maintaining the secondary ignition circuit in operative position and further suction responsive means for disengaging the starter circuit upon starting of the engine.

A still further feature of the invention resides in the provision of a novel control means for properly adjusting the throttle valve of the engine for idling operation upon engagement of the remote control switch; together with latch means for maintaining the throttle valve in its adjusted position after the solenoid setting means has been deenergized; and further accompanied by a novel control linkage for the throttle valve for disengaging the actuating instrumentalities of the device upon operation of the manual control of the throttle valve.

Yet another very important feature of the invention resides in the provision of a highly efficient circuit control means carried by the vehicle, for rendering the remote control actuated starting circuit of the device inoperative except when the vehicle is parked or positioned in a predetermined position in its garage or other place of storage.

And a final important feature of the invention to be specifically enumerated herein resides in the provision of an automatic starting device for remotely controlling the starting of an engine which shall be compact, of simple construction, yet highly efficient and dependable in its operation.

These, together with various ancillary features and objects of the invention which will later become apparent as the following description proceeds, are attained by this device, the preferred embodiment of which has been illustrated by way of example only in the accompanying drawings, wherein:

Figure 1:
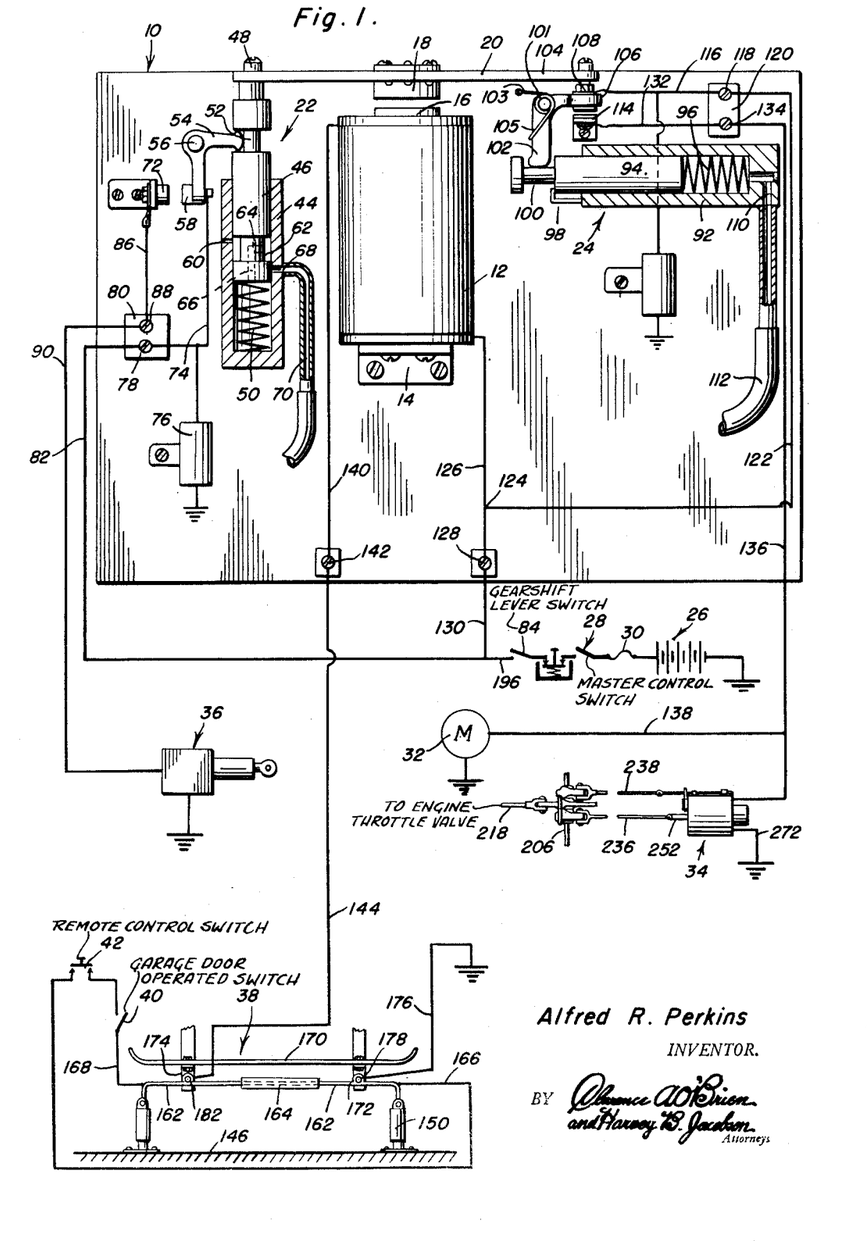
Figure 1 is a diagrammatic view illustrating the operative association of the various elements of the invention.

Referring now more particularly to the accompanying drawings, wherein like numerals designate similar parts throughout the various views, attention is directed first to Figure 1 for a general understanding of the various elements making up the improved apparatus constituting the preferred embodiment of the invention.

It may be here noted that in essence, the invention comprises electrical instrumentalities for energizing the vehicle starter circuit, establishing an alternative ignition circuit, bypassing the normal ignition circuit of the vehicle, and adjusting the position of the throttle valve, or if preferred of the choke valve of the engine for starting and causing continued idling of the engine. The various operating instrumentalities are all housed in a single compact casing which may be readily mounted upon or removed from a vehicle at any convenient part thereof, as desired, and which is electrically connected to the vehicle battery for establishing suitable electrical operating circuits. The invention further comprehends a primary circuit closing switch consisting of electrical conductors suitably positioned in a garage or other storage space in which the vehicle is to be parked, together with terminals carried by the vehicle such as by the bumper thereof, for engagement with the above mentioned stationary conductors, whereby the mechanism is prevented from operating until the vehicle is parked in a predetermined manner. Further safety means are provided such as a switch in the primary circuit of the device which is responsive to opening or closing of the garage door, to insure that the door is open before the engine can be started to thereby obviate the danger of an accumulation of carbon monoxide gas as the engine warms up. The invention further includes a remote control switch which, when the garage door is open, the gear shift of the vehicle is in neutral, and a primary or master switch has been properly set in the vehicle, is capable of setting the device into operation from a remote point such as within the driver's house or the like.

The efficiency of the device is enhanced by the provision of means responsive to the starting and operation of the engine, such as the manifold suction created thereby, for discontinuing the primary electrical circuit of the device for conserving the battery of the vehicle; for maintaining the alternative ignition circuit in operating condition; in discontinuing the starter and throttle or choke valve operating or adjusting electrical circuits.

Indicated generally at 10 in Figure 1 is a casing or housing of any suitable construction and which is adapted to be mounted detachably in any suitable part of a vehicle such as to the dash thereof, by any suitable conventional means, not shown. Positioned and mounted within the casing 10, is the primary or main electromagnet 12, which may be carried by suitable brackets 14 from the walls of the casing 10. This magnet 12 is provided with a pole 16 for operating a solenoid core 18 of any suitable construction and mounting, which core is provided with an armature bar 20. The extremities of this armature bar operate an ignition controlling switch indicated generally at 22 and a starter and throttle valve adjusting switch indicated generally at 24. Electrically connected with the elements within the casing 10 in a manner to be set forth hereinafter, are the vehicle battery indicated generally at 26, a gear shift lever operated switch indicated generally at 84, a safety fuse 30, the engine electric starter 32, the throttle or choke valve adjusting means indicated generally at 34, the various essential elements of the engine ignition system indicated generally at 36 and which are to be operated by an alternative electric circuit as set forth hereinafter; the car bumper operated switch 38, the garage door operated switch 40 and the remote control switch 42.

Referring now again to Figure 1, it will be seen that the starting ignition circuit switch 22 includes a cylinder 44 within which is slidably mounted a plunger 46 whose upper end is detachably connected as at 48 to one extremity of the armature bar 20. The lower end of the plunger engages a spring means 50 of any suitable construction, a coil spring being shown for convenience in the drawing, which urges the plunger 46 into its raised or idle position. The upper portion of the plunger is provided with an annular groove 52 within which rides or is engaged one arm of a bell crank 54 pivoted as at 56 and whose other arm is provided with an electrical contact 58. Suitably positioned in the cylinder 44 is a vent passage 60 communicating with the atmosphere for a purpose to be later apparent. Adjacent its lower end, the plunger 46 is provided with an annular groove 62.

Intersecting bores 64 and 66 communicate respectively with each other, with the annular groove 62 and with the lower surface of the plunger 46 as shown in dotted lines in Figure 1. The cylinder 44 is provided with a port 68 to which is connected a conduit 70 which extends to and is suitably connected with the intake manifold of the engine, not shown, for a purpose to be now described.

The vent 60 is so positioned as shown in Figure 1 as to register with the annular groove 62 when the plunger is in its fully raised position as determined by the uppermost position of the movable armature bar 20; whereby to vent the space surrounding the annular groove 62 and by means of the intersected bores 64 and 66, the chamber within the cylinder 44 to the atmosphere to prevent a dash pot effect. Similarly, the port 68 is positioned to be closed by the solid lower portion of the plunger 46 in its raised position as shown in Figure 1, whereby to cut off communication through the passageway or conduit 70 of the cylinder 44 with the intake manifold, but to establish such communication when the plunger 46 is sufficiently depressed by the armature bar 20 to cause registration of the annular groove 62 with the port 68. As soon as the plunger has been so depressed, the suction of the intake manifold is supplied by means of grooves 62, bores 64 and 66 to the lower side of the plunger 46 for maintaining the latter in its lowered position against the opposition of the spring 50. This lowering of the plunger causes a clockwise movement of the bell crank 54, to thereby engage the movable contact 58 with a stationary contact 72 suitably insulatingly carried by a wall of the casing 10. Thus, when the armature bar 20 is moved downwardly by means of the pole 16 of magnet 12 attracting the core 18, the plunger 46 is lowered disposing the contacts 58 and 72 to thereby establish an alternate ignition circuit as set forth hereinafter, to thereby permit operation of the internal combustion engine. As soon as the plunger 46 has been sufficiently lowered, communication is established with the intake manifold of the engine, and upon starting of the same the suction applied to the lower surface of the piston 46 maintains the contact points 58 and 72 closed and the alternative ignition circuit in operative condition.

Thus, after the initial actuation of the magnet 12 and the closing of the contacts 58 and 72, the suction of the engine manifold will maintain the alternate electrical ignition circuit in operation, when the magnet 12 is subsequently deenergized in a manner which will be presently apparent.

An electrical conductor 74 is connected to the movable contact 58, and to a replacement conductor 76 suitably mounted within the casing 10, and by means of a binding post 78 carried by insulating handle 80 suitably mounted within the casing 10, is connected with a conductor 82 which is in circuit with the vehicle battery 26 by means of the previously mentioned fuse 30, gear shift lever switch 84, and a master control switch suitably mounted in any convenient point within the vehicle, and indicated at 28. A conductor 86 is connected to the fixed terminal 72, and by means of binding post 88 on the handle 80, is connected with a lead 90 which is connected with the above mentioned essential ignition elements such as the spark coil, breaker points, distributor and the like, to thereby establish a by-pass circuit between the essential ignition elements and the spark plugs of the engine, whereby the latter may be operated despite the normally open position of the customary ignition switch of the vehicle.

Attention is now directed to the construction and operation of the starter and throttle actuating switch 24. This mechanism includes a cylinder 92 mounted in any suitable manner within the casing 10, and provided with a piston plunger 94 therein, yieldingly urged outwardly of the cylinder as by means of a spring 96 of any suitable construction. A stop or latch 98 is provided at the outer end of the cylinder for limiting the outward movement of the plunger 94. The outer extremity of this plunger is provided with an annular groove or reduced portion 100 which receives and actuates one end of a bell crank 102, having a spring 101 coiled on the pivot pin 104, with one arm 103 anchored to the casing and the other arm 105 engaging the crank 102 which is pivoted as at 104 at any suitable point within the casing 10, which bell crank at its other end is provided with a movable electric terminal 106. The bell crank also carries an adjusting screw or nut 108, which is engageable by the other extremity of the armature bar 20 for operation of the bell crank in one direction with an adjustable lost motion therebetween.

Communicating with the interior of the cylinder 92 at the inner surface of the plunger 94, is a passage 110, connected as by a conduit 112 to the previously mentioned intake manifold of the engine, not shown. A stationary electrical contact 114 is suitably mounted in an insulated manner upon the casing 10, for engagement by the movable terminal 106 for a purpose which will be subsequently apparent. Connected to the movable contact 106, is electrical conductor 116, which by means of a binding post 118 carried by an insulating bracket 120, is connected with a cable 122 which in turn is connected as at 124, with a cable 126 supplying current to the electromagnet 12 from a binding post 128 and electrical lead 130 from the battery 26.

The stationary contact 114, is likewise connected by a lead 132 and binding post 134, with an electric cable 136 which is electrically connected to the starter lead 138, and likewise to the previously mentioned throttle valve actuating solenoid 34.

The operation of this element is as follows. When electromagnet 12 is momentarily energized, and the armature bar 20 is depressed, the bell crank 102 is rotated in a clockwise direction, thus permitting the plunger 94 to be forced to its outermost position against the stop 98 by the pressure of the spring 96. At this outermost position, and with the armature bar 20 depressed, the contacts 106 and 114 are closed, whereby current may flow from the battery 26, through the lead 130, connection 124, cable 122, lead 116, cable 132, and conductor 136 to the starting cable 138 causing actuation of the starter, and also to the throttle valve actuating solenoid 34, actuating and setting the throttle valve in idling and starting position as set forth hereinafter. However, as soon as the engine has started, the suction supplied from the manifold by means of conduit 112 causes an inward movement of the plunger 94 against the pressure of spring 96, thereby causing a counter-clockwise rotation of the bell crank 102, and breaking the circuit between the contacts 106 and 114, thereby deenergizing the conductor 136, and rendering the starter 32 inoperative and deenergizing the throttle actuating solenoid 34. It will thus be seen that as soon as the engine starts, the starting circuit and the throttle actuating solenoid circuit are disconnected, thereby preventing unnecessary current consumption from the battery 26.

It should now be noted that the cable 126, when all the necessary switches are closed, supplies current to the electromagnet 12, this current returning by means of a conductor 140, binding post 142, and conductor 144 to the car position actuated switch 38 as set forth hereinafter.

Attention is now directed more specifically to Figures 1, 7–10 for an understanding of the construction of the switch 38. As will be seen best by reference to Figure 9, upon any suitable support surface such as a wall 146 of the garage or place where the car is stored, are mounted a pair of support brackets 148 which are of cylindrical tubular construction. Telescopically received upon the outer ends of these brackets 148, are tubular members 150, which are urged outwardly of the members 148 as by means of enclosed coiled springs 152 positioned therebetween. Any suitable means may be provided for preventing complete removal of the member 150 from the member 148, such for example as a pin and slot engagement indicated at 154 between these members.

Figure 10:
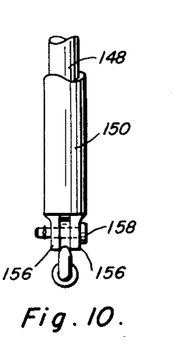
Figure 10 is a fragmentary elevational view of a portion of a resilient support rod forming an element of the device shown in Figure 9, being taken substantially from the plane of the section line 10—10 of Figure 9.

It will thus be seen that there are provided a pair of preferably horizontally extending standards, which are identical in construction, and each of which consists of the members 148 and 150, these telescopic members being spring urged outwardly of each other. As shown in Figure 10, each of the standards is provided at its outer end with a pair of ears 156 between which are pivoted as by a pivot pin 158, the extremity 160 of a conductor or contact terminal 162. The adjacent ends of the terminals 162 are received in an insulating bushing 164 which may be of rubber or the like, and serves to resiliently support the ends of the terminal 162 and maintain the latter in a desired position. Electrically connected to the terminal 162 are a pair of conductors 166 and 168 respectively.

As shown in Figure 1, the remote control switch 42 and the door operated switch 40 are connected in series with each other and to the conductor 168, while the conductor 166 is connected to the other side of the remote control switch 42. It will thus be seen that when the adjacent ends of the terminals 162 are bridged across the insulator 164, a closed circuit is established. This bridging means is effected by terminals mounted upon the vehicle to which terminals are connected the instrumentalities within the casing 10.

Figure 7:
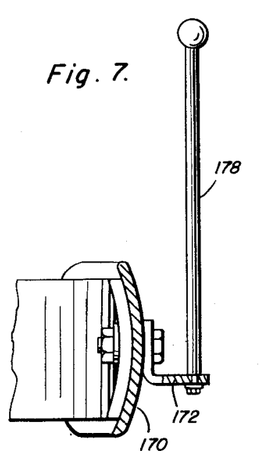
Figure 7 is a fragmentary detail view of one of the circuit contacts mounted upon the bumper of the vehicle, the grounding terminal being illustrated.
Figure 8:
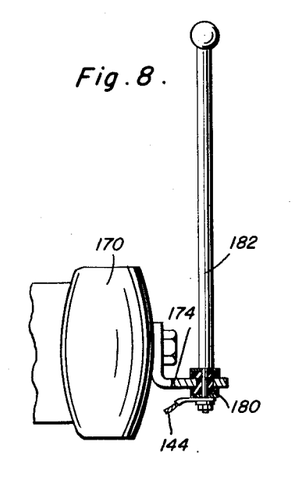
Figure 8 is a view similar to Figure 7 but illustrating the live terminal carried by the bumper.
Figure 9:
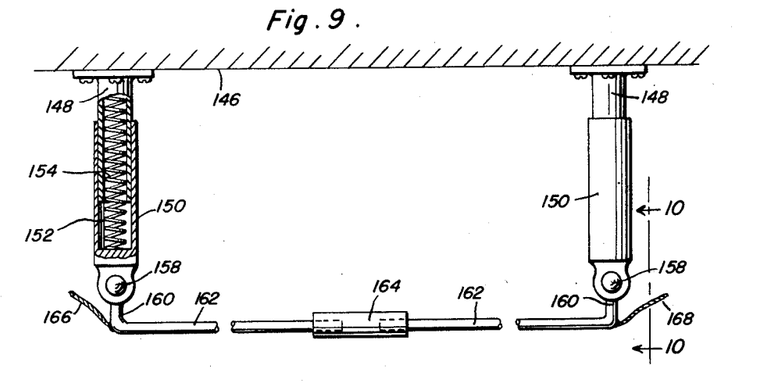
Figure 9 is a top plan view of the car position actuated switch, parts being broken away and shown in section.

Referring now primarily to Figures 7 and 8, and with reference to Figure 1, it will be seen that the conventional bumper 170 of the vehicle as mounted thereon either forwardly or rearwardly thereof, but preferably to the rear of the bumper, a pair of brackets 172 and 174 respectively. The bracket 172 is preferably grounded to the frame of the vehicle as by means of a ground conductor 176 indicated in Figure 1, and has mounted thereon in electrically conductive relation therewith, a metallic mast 178 preferably in the form of an upstanding metal rod. Mounted upon the bracket 174, but insulated therefrom as by a rubber bushing 180 or the like, is a second upstanding mast 182 of electrically conductive material such as a rod otherwise similar to the rod 178. The previously described electrically conductive cable 144 is connected to the lower end of the rod 182. The arrangement is such that when the vehicle is driven into its parking space, the ground mast 178 and the insulated mast 182 are respectively pressed against the laterally extending terminal rods 162, and by means of the yielding of the standards by virtue of the springs 152, a resilient electrical contact is established between the terminals 162 which may be considered to be the stationary terminals and the masts 178 and 182 which may be regarded as the movable terminals. It will now be seen that with the car properly positioned in its parking space, and all of the various switches closed, that when the remote control switch 40 is actuated that current is free to flow from the battery 26, to the primary electromagnet 12, and thence by way of conductor 144, mast 182, stationary terminal 162, cable 168, remote control switch 42, door control switch 40, and cable 166 to the ground terminal 162, ground mast 178, and ground lead 176 back to the battery 26. It will thus be seen that the stationary and movable terminals of the element 38 provide a series of switches in the circuit of the primary electro-actuating magnet 12. As aforementioned, upon energization of the magnet 12, the ignition switch 22, the starter and throttle adjusting switch 24 are actuated for starting the engine and running the same at average speed.

It may be here noted that the door of the garage, not shown, may be electrically operated from a remote point such as the house of the vehicle operator by any suitable electrical circuit, not shown, whereby the switch 42 may be positioned selectively in an open or closed position in the electromagnet circuit of the primary magnet 12.

Figure 11:
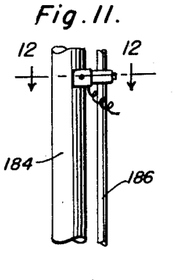
Figure 11 is a fragmentary elevational view showing a gear shift control switch of the device; and, Figure 12 is a detail view upon an enlarged scale taken substantially from the plane of the section line 12—12 of Figure 11.
Figure 12:
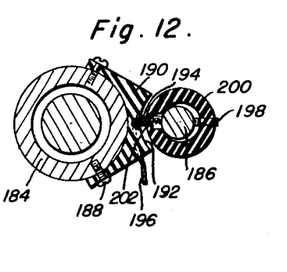

The gear shift operated switch 84 may be of any suitable construction, it being merely necessary that the switch is operable to disrupt all circuits of the device if the gear shift lever is not in its neutral position. A satisfactory embodiment of the switch is shown in Figures 11 and 12, wherein the steering post column or housing 184 of the vehicle has suitably mounted thereon in a manner not shown a gear shift actuating shaft 186 which is customarily rotatable or oscillatable for operating the gear shift mechanism of the vehicle. Secured as by fastening screws 188 to the steering column 184, is an insulated or insulating block 190 having an arcuately shaped face 192 adjacent the gear shift actuating shaft 186. A metallic conducting plate 194 is suitably secured to the arcuate face 192, this plate being connected as by a conductor 196 with the conductors 130 and 82 previously mentioned. Cooperating with the contacting plate 194, is a movable switch member. By means of a set screw 198 an annular ring 200 preferably of insulating material is adjustably secured to the gear shift lever shaft 186. A spring pressed terminal 202 of any suitable construction is urged outwardly of the annular ring 200 for engagement with the stationary contact plate 194 when the gear shift lever shaft 186 is positioned with the gear shift lever in neutral position. A suitable electrical connection, not shown, connects the spring pressed contact 202 with the master switch 28. The function of this switch will thus be evident, and is intended purely as a safety measure to prevent actuation of the starter and engine if the vehicle should be inadvertently left in gear.

Attention is now directed to Figures 1–6 and 13 for an understanding of the construction and operation of the throttle adjusting mechanism 34. As shown in Figures 1–3 and 13, a portion of the block of the engine, 204, has mounted therein a laterally extending fulcrum pin 206, upon which are pivotally mounted a series of levers which are detachably retained thereon as by a washer 208 and cotter pin 210.

Freely journalled upon the shaft or fulcrum pin 206 is a lever system consisting of three levers, one of which constitutes a bell crank having angularly disposed arms 212 and 214. The arm 214 is pivotally connected as at 216 to a link 218 which in turn is connected to the throttle valve or choke 219 of the engine 204. Adjacent the bell crank is journalled a second lever 220, this lever being provided with an extension 221 having a laterally disposed actuating pin 222 therein and to which lever is pivotally connected at its extremity as by a pivot pin 224, a link 226 which in turn is coupled by means of the pivoted bell crank 229 to the customary foot pedal 227 of the vehicle for controlling the throttle valve. A third lever 228 is journalled upon the fulcrum end 206, this lever being provided with an extension 230 having a notch 232, see Figure 2, which is engageable with one extremity of the transverse pin 222 for a purpose to be later set forth. At the other extremity of the lever 228, there is pivoted as at 234, a connecting link 236 for a purpose to be later set forth. To the end of the bell crank arm 212, is connected a link 238 by means of a pivot pin 240, for a purpose to be later set forth.

The connecting link 236 is connected to the armature or core of the solenoid actuating member of the switch member 34, while the connecting link 238 is operatively associated with a latching mechanism to be subsequently described.

Figures 4, 5, 6:
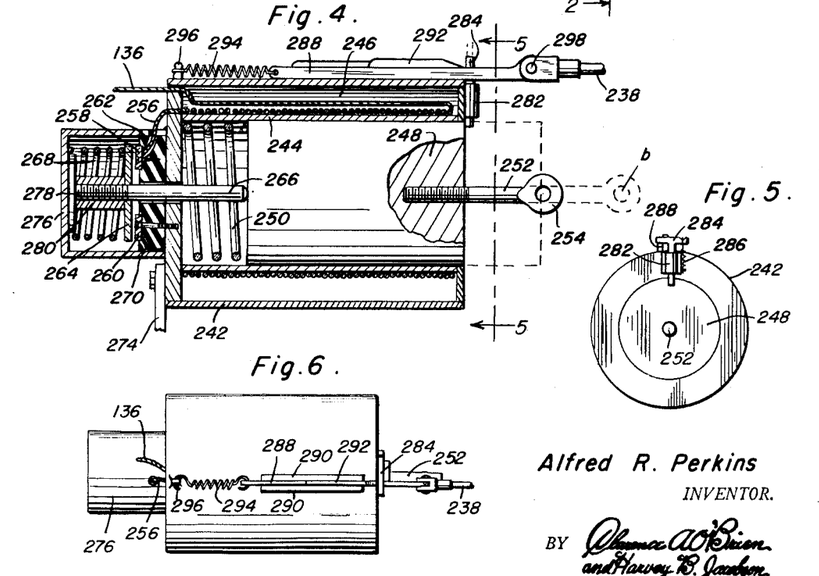
Figure 4 is an elevational view, parts being broken away and shown in section, of the electromagnetic operating and latching means for operating the throttle cracking mechanism.
Figure 5 is a vertical sectional view taken substantially from the plane of the section line 5—5 of Figure 4.
Figure 6 is a top plan view of the device shown in Figure 4.

Attention is now directed more specifically to the solenoid operating means for actuating the lever system of the throttle control mechanism. As will be seen by reference to Figure 4, a hollow casing 242 preferably of insulating material is provided with a steel cylinder 244 therein, an electromagnetic coil 246 being positioned between the casing 242 and the steel lining 244, this coil being electrically connected with the electric lead 136 as shown in Figures 1 and 4. A soft iron armature or plunger 248 is slidably received in the metallic cylinder 244 for reciprocation therein in the usual manner of solenoids, the plunger being urged outwardly of the cylinder of the solenoid by means of a coil spring 250 abutting the inner end of the plunger. Secured to the outer end of the plunger is an actuating rod 252 provided with an eye or head 254 adapted for engagement by the previously mentioned connecting link or rod 236. Thus, as the solenoid core 248 is operated by energization of the coil 246 for return by the bias of the spring 250, the connecting link 236 and the lever 228 is operated for a purpose which will be subsequently set forth.

The electromagnetic coil 246 is grounded as by a lead 256 which passes through the control switch including a stationary contact 258 connected to the lead, and a further contact 260. The lead 256 preferably extends through a suitable bore or passage in the cover plate or head 262 of the solenoid casing, this cover plate being preferably of insulating material, within the outer surface of which is embedded the two contacts 258 and 260.

A metallic switch blade 264 is adapted to engage the contacts 258 and 260, this switch blade being preferably an annular plate of electrically conductive material which is screw-threadedly engaged upon a switch stem 266 slidably received in an axial bore in the cover 262, the inner end of this stem being engageable by the inner end of the solenoid plunger 248 in the innermost position of the latter. A spring 268 yieldingly urges the switch blade 264 into switch closing position, this blade being prevented from closing the contacts 258 and 260 by engagement of the plunger 248 with the stem 266 in the innermost position of the plunger. However, when the plunger is at the outer end of its stroke, the spring 268 is free to cause the plate 264 to close the contacts 258 and 260, this latter contact being connected as by a lead 270 with any suitable ground, such as a lead 272, shown in Figure 1. As indicated at 274 in Figures 4 and 13, the solenoid casing is mounted by a bracket at any convenient location upon the body of the vehicle, in proximity to the lever system for operating the engine throttle valve 219.

As indicated at 276, a removable cover is provided upon the casing 242 for enclosing the spring 268 and the end of the stem 266. The extremity of the stem 266 is screw-threaded as at 278, whereby the switch blade 264 may be adjusted thereon, and a locking nut or other equivalent means 280 is provided for maintaining the blade in its adjusted position thereon. As will be readily seen, upon proper adjustment of the blade, upon the stem 266, the position in the inward travel of the plunger 248 whereby the latter engages the stem 266 and opens the switch contacts can be adjusted.

Accordingly, it will be seen that when the primary circuit of the device is closed by means of the electromagnet 12, and the element 24, the lead 136 will be energized, the solenoid coil 246 will be electrified, and the plunger 248 drawn inwardly thereof against the opposition of the spring 250. This inward movement of the plunger will operate the link 236 and the lever 228. Upon the completion of the inward movement of the plunger or substantially upon the completion of the same, the stem 266 will be actuated to open the switch 258, 260 and 264, thereby de-energizing the coil 246 whereby further consumption of current from the battery 26 is prevented. However, if means were not provided for retaining the plunger in its inward position, the spring 250 would cause a return movement thereof with an immediate return of the throttle controlling linkage to its original position. To obviate the premature return of this linkage, a latching means is provided.

This latching means includes a guide 282 secured to the end of the casing 242, together with a T-shaped latch 284 which is slidable therein so that its inner end is disposable in latching engagement beneath the outer ends of the plunger 248 as shown in the position of Figure 4. This latch is urged into its latching position by means of a spring 286, see Figure 5, secured to one end of the cross form of the T-shaped member.

Withdrawal of the latch is effected in properly timed relation, to the actuation of the rest of the mechanism, by a cam bar 288 which is slidably mounted for longitudinal movement upon the outer surface of the casing 242, between a pair of ribs constituting guides, 290. This cam bar is provided with a cam surface 292, which as shown best in Figures 5 and 6, is engageable beneath the other arm of the T-shaped member 284. The cam bar 288 is yieldingly urged into its inoperative position by means of a spring secured thereto and anchored to a lug 296 carried by the casing 242. The cam is forced against the opposition of the spring 294 into the latch disengaged position, whereby the cam surface 292 is inserted in the cross arm of the T-shaped member 284, by means of the above mentioned connecting link 238, which is pivoted to the end of the cam bar as at 298.

The operation of the solenoid latching means is as follows. Upon energization of the coil 246, the plunger 248 is drawn inwardly until adjacent the inner end of the stroke the plunger actuated switch deenergizes the coil 246. However, the momentum of the plunger as it completes its inward stroke is sufficient to permit the spring pressed latch 284 to engage the outer end of the plunger, preventing its return movement. During this inner plunger movement, the connecting link 236 as operated by lever 228 and in a manner to be subsequently described has opened the throttle valve 219 of the engine to its starting and idling position. As will thus be seen, the spring pressed latch 284 prevents the return movement of the plunger 248, and thus maintains the throttle valve in its starting and idling position. When the connecting link 238 is actuated, in a manner to be subsequently set forth, the cam bar 288 is moved to the right in Figure 4 and downwardly in Figure 13, causing the cam surface 292 to raise the cross arm of the T-shaped member 284, thus withdrawing the latch from the plunger 248, and permitting the spring 250 to return the connecting link 236 to its original or rest position. It will thus be seen that a single, short impulse of the solenoid coil 246 is sufficient to operate the plunger 248, set the throttle valve 219 in its starting position, and permit the latch 284 to lock the same throughout the idling period of the engine.

Figures 2, 3:
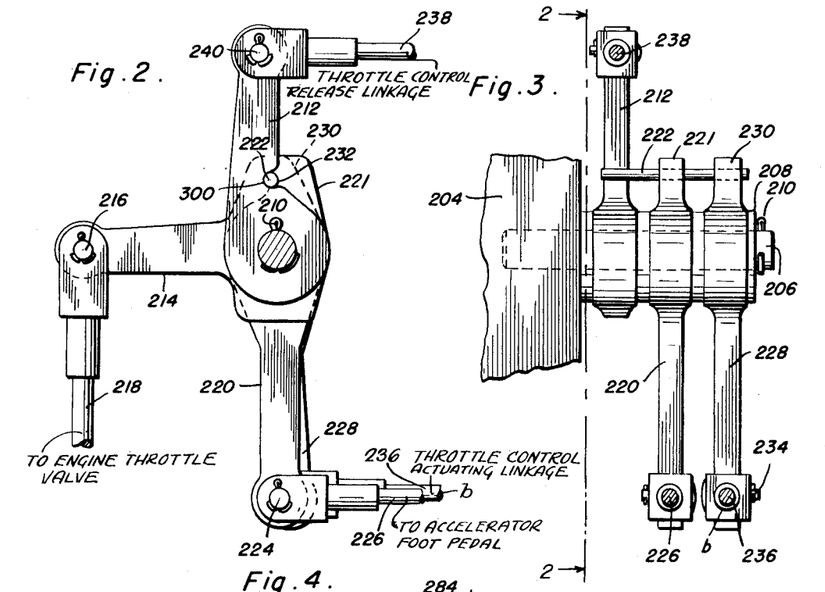
Figure 2 is a side elevational view, taken substantially from the plane of the section line 2—2 of Figure 3, showing the throttle control or cracking means of the device.
Figure 3 is a front elevational view, taken from the right of Figure 2.
Figure 13:
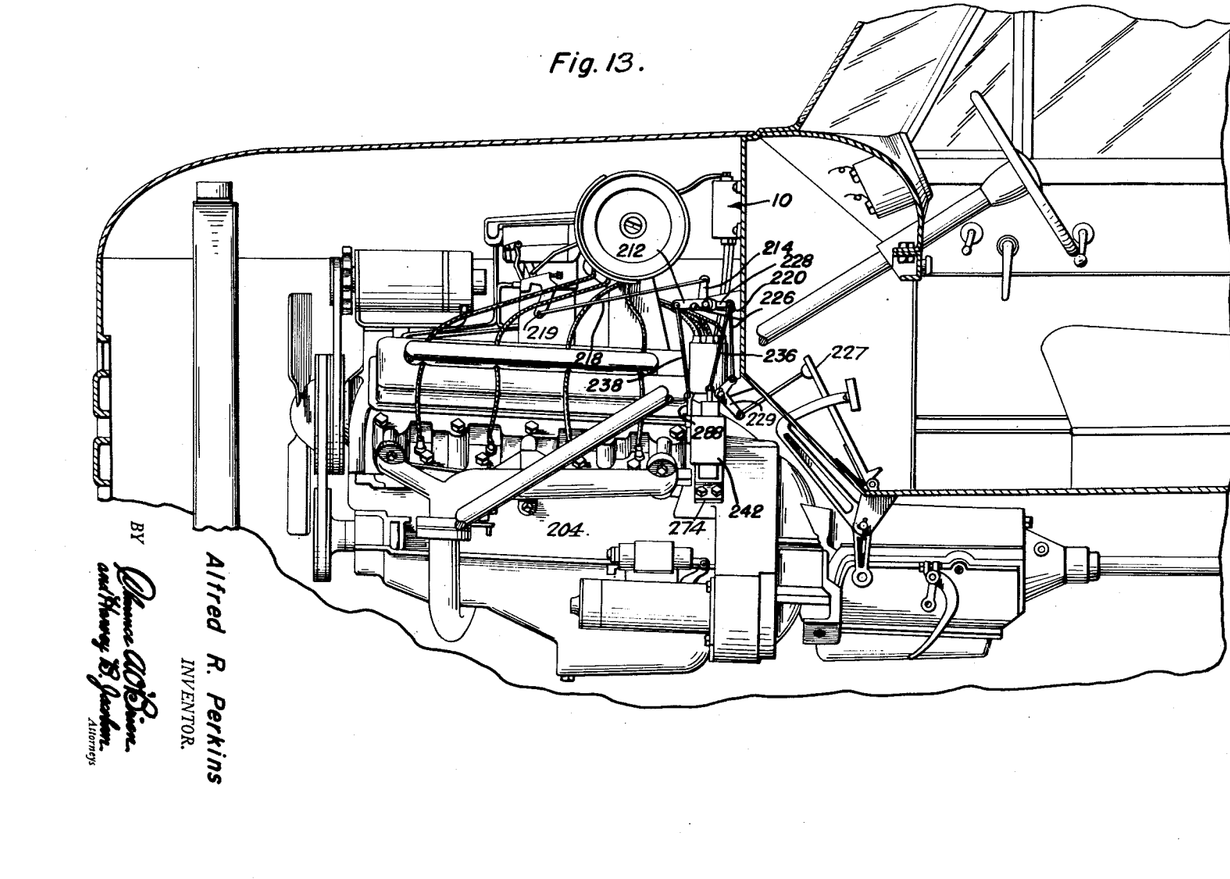
Figure 13 is a vertical side view of an automobile engine showing parts broken away and illustrating in particular the application of the instant invention to the engine of an automobile.

Attention is now directed more particularly to Figures 2, 3 and 13 for a better understanding of the actuation and control of the adjustment of the engine throttle valve or choke 219 with which this device may be associated. As above mentioned, bell crank arm 214 is connected by the lever 218 to the engine throttle valve 219. When the accelerator pedal 227 is operated or moved downwardly as in Figure 13 by the driver, lever 220 is pulled down by link 226, thus actuating the transverse pin 222, one end of which engages the bell crank arm 212 in a notch or sleeve 300 therein, as shown in Figure 2. Thus, upon actuation of the accelerator pedal 227 to a position to speed the motor beyond its idling speed, as when the driver of the vehicle is ready to operate the same, the bell crank 212, 214 is rotated by the pin 222 of the lever 220 so as to move the link 218 to the right as seen in Figure 13, thus opening the throttle valve. This movement is permitted, since the other extremity of the pin 222 is drawn out of the recess 232 in the extension 230 of the lever 228. As above mentioned, the lever 228 is connected by the link 236 with the solenoid plunger rod 252, in such a manner that upon the inward movement of the solenoid plunger, previously described, the lever 226 is rotated clockwise as seen in Figure 13, thus causing the link 232 to engage the end of the pin 222, and rotate the pin and lever 220 therewith, whereby the other end of the pin 222 pressing against its link 300 in the bell crank arm 212 opens the throttle valve or choke 219 to its desired idling and starting position. When the link 226 is operated by the accelerator pedal 227 to move the lever 220 as above mentioned to the position causing a further opening of the engine throttle valve beyond driving position, the bell crank arm 212 actuates the link 238 pulling the same upwardly as seen in Figure 13, to cause movement of the cam bar 288 effecting a release of the latch member 284, thus permitting a retraction of the solenoid plunger 248 and a return of the plunger operated lever 228 to its rest position.

It will thus be seen that the linkage above described permits normal operation of the engine in an efficient manner, while automatically effecting a setting of the throttle or choke valve to a position to permit starting and idling of the engine. It will also be seen that upon actuation of the accelerator pedal this automatic setting of the throttle valve is conveniently released until the next energization of the remote control starting mechanism.

From the foregoing, it is felt that the manner of constructing and operating the device, and the advantages arising therefrom will be readily understood and further explanation is believed to be unnecessary. However, since numerous modifications will readily occur to those skilled in the art after a consideration of the foregoing specification and accompanying drawings, it is not intended to limit the invention to the exact construction shown and described, and all suitable modifications and equivalents may be resorted to falling within the scope of the appended claims.

Having described the invention, what is claimed as new is:

1. A remote control engine starting device comprising an engine having an electric starter operatively associated therewith, an electric circuit for actuating said starter, a throttle valve controlling said engine and means responsive to energization of said starter circuit for opening said throttle valve, said means including a solenoid connected to said starter circuit for energization thereby, and connecting linkage for opening said throttle valve by movement of the plunger of said solenoid, a spring for urging said solenoid plunger into its inoperative position and a latch yieldingly urged into position for locking said plunger into its operative position.

2. The combination of claim 1 including latch releasing means, said latch releasing means being connected to the engine accelerator pedal.

3. A remote control engine starting device for automotive vehicles having an engine, an electric system including a starter circuit and a vehicle bumper, comprising; a control circuit for actuating said starter circuit, a manually operable switch remote from said vehicle for energizing said control circuit, stationary switch terminals in said control circuit mounted independently of said vehicle, movable switch terminals in said control circuit mounted on the vehicle bumper and abuttingly contacting said stationary switch terminals, a secondary ignition circuit, an ignition switch normally urged into a position rendering said secondary ignition circuit inoperative and means responsive to actuation of said control circuit for moving said ignition switch into a position closing said secondary ignition circuit.

4. A remote control engine starting device for automotive vehicles having an engine, an electric system including a starter circuit and a vehicle bumper, comprising; a control circuit for actuating said starter circuit, a manually operable switch remote from said vehicle for energizing said control circuit, stationary switch terminals in said control circuit mounted independently of said vehicle, movable switch terminals in said control circuit mounted on the vehicle bumper and abuttingly contacting said stationary switch terminals, a secondary ignition circuit, an ignition switch normally urged into a position rendering said secondary ignition circuit inoperative and means responsive to actuation of said control circuit for moving said ignition switch into a position closing said secondary ignition circuit, and means energized by engine operation for maintaining said ignition switch in circuit closing position.

5. A remote control engine starting device for automotive vehicles having an engine, an electric system including a starter circuit and a vehicle bumper, comprising; a control circuit for actuating said starter circuit, a manually operable switch remote from said vehicle for energizing said control circuit, stationary switch terminals in said control circuit mounted independently of said vehicle, movable switch terminals in said control circuit mounted on the vehicle bumper and abuttingly contacting said stationary switch terminals, a secondary ignition circuit, an ignition switch normally urged into a position rendering said secondary ignition circuit inoperative and means responsive to actuation of said control circuit for moving said ignition switch into a position closing said secondary ignition circuit, and means energized by engine operation for maintaining said ignition switch in circuit closing position, said last means including a conduit connected with the engine intake manifold, a piston connected with said ignition switch and yieldingly urged to switch opening position and actuated by manifold suction to switch closing position.

6. A remote control engine starting device for automotive vehicles having an engine, an electric system including a starter circuit and a vehicle bumper, comprising; a control circuit for actuating said starter circuit, a manually operable switch remote from said vehicle for energizing said control circuit, stationary switch terminals in said control circuit mounted independently of said vehicle, movable switch terminals in said control circuit mounted on the vehicle bumper and abuttingly contacting said stationary switch terminals, a starter switch for said starter circuit, actuating means for said starter switch operable upon completion of said control circuit by said manually operable switch, resilient means normally holding said starter switch open, a plunger for opening said starter switch, means for holding said plunger inoperative and means responsive to operation of said engine for positively opening said starter switch.

7. A remote control engine starting device for automotive vehicles having an engine, an electric system including a starter circuit and a vehicle bumper, comprising; a control circuit for actuating said starter circuit, a manually operable switch remote from said vehicle for energizing said control circuit, stationary switch terminals in said control circuit mounted independently of said vehicle, movable switch terminals in said control circuit mounted on the vehicle bumper and abuttingly contacting said stationary switch terminals, a starter switch for said starter circuit, actuating means for said starter switch operable upon completion of said control circuit by said manually operable switch, resilient means normally holding said starter switch open, a plunger for opening said starter switch, means for holding said plunger inoperative and means responsive to operation of said engine for positively opening said starter switch, a secondary ignition circuit, an ignition switch normally urged into a position rendering said secondary ignition circuit inoperative and means responsive to actuation of said control circuit for moving said ignition switch into a position closing said secondary ignition circuit.

8. A remote control engine starting device for automotive vehicles having an engine, an electric system including a starter circuit and a vehicle bumper, comprising; a control circuit for actuating said starter circuit, a manually operable switch remote from said vehicle for energizing said control circuit, stationary switch terminals in said control circuit mounted independently of said vehicle, movable switch terminals in said control circuit mounted on the vehicle bumper and abuttingly contacting said stationary switch terminals, a starter switch for said starter circuit, actuating means for said starter switch operable upon completion of said control circuit by said manually operable switch, resilient means normally holding said starter switch open, a plunger for opening said starter switch, means for holding said plunger inoperative and means responsive to operation of said engine for positively opening said starter switch, a secondary ignition circuit, an ignition switch normally urged into a position rendering said secondary ignition circuit inoperative and means responsive to actuation of said control circuit for moving said ignition switch into a position closing said secondary ignition circuit, a common actuator for simultaneously closing said ignition switch and said starter switch upon closing of said manually operable switch.

9. A remote control engine starting device for automotive vehicles having an engine, an electrical system including a starter circuit, an ignition circuit, and a control circuit; said control circuit including a solenoid armature bar, said ignition circuit including an ignition switch, a pluger attached to said armature bar yieldingly retaining said switch in its open position, said plunger having a first annular groove adjacent its upper end, a bell crank attached to said switch and engaging said plunger in said first annular groove whereby said switch is actuated by said plunger.

10. A remote control engine starting device for automotive vehicles having an engine, an electrical system including a starter circuit, an ignition circuit, and a control circuit; said control circuit including a solenoid armature bar, said ignition circuit including an ignition switch, a plunger attached to said armature bar yieldingly retaining said switch in its open position, said plunger having a first annular groove adjacent its upper end, a bell crank attached to said switch and engaging said plunger in said first annular groove whereby said switch is actuated by said plunger, said plunger being encased in a cylinder, said plunger having a second annular groove adjacent its lower end, said cylinder having a vent passage communicating with said second annular groove, intersecting bores in said plunger communicating with said second annular groove and said lower end of said plunger.

11. A remote control engine starting device for automotive vehicles having an engine, an electrical system including a starter circuit, an ignition circuit, and a control circuit; said control circuit including a solenoid armature bar, said starter circuit including a starter switch having a movable contact and a stationary contact, said movable contact comprising a bell crank, means yieldingly urging said movable contact against said armature bar, a plunger having an annular groove therein, said bell crank being received in said annular groove whereby said starter switch is controlled by movement of said plunger.

12. A remote control engine starting device for automotive vehicles having an engine, an electrical system including a starter circuit, an ignition circuit, and a control circuit; said control circuit including a vehicle bumper having thereon movable switch terminals, said movable terminals comprising a pair of metallic masts, stationary switch terminals comprising a pair of horizontal standards having contact terminals mounted therebetween, means resiliently urging said contact terminals against said metallic masts.

ALFRED R. PERKINS.

REFERENCES CITED

The following references are of record in the file of this patent:

UNITED STATES PATENTS

| Number | Name | Date |
| --- | --- | --- |
| 1,137,519 | Newburger | Apr. 27, 1915 |
| 1,293,569 | Stein | Feb. 4, 1919 |
| 1,344,464 | Varley | June 22, 1920 |
| 1,423,107 | Harrington | July 18, 1922 |
| 1,444,403 | Varley | Feb. 6, 1923 |
| 1,501,046 | Goodrum | July 15, 1924 |
| 1,654,220 | Johnstone et al. | Dec. 27, 1927 |
| 1,774,492 | Thorne | Aug. 26, 1930 |
| 1,909,139 | Wells | May 16, 1933 |
| 1,930,200 | Harrison | Oct. 10, 1933 |
| 1,936,619 | Christian | Nov. 28, 1933 |
| 1,939,606 | Haas | Dec. 12, 1933 |
| 1,940,349 | Haas | Dec. 19, 1933 |
| 1,999,199 | McGrath | Apr. 30, 1935 |
| 2,041,541 | Good | May 19, 1936 |
| 2,048,130 | Lustig | July 21, 1936 |
| 2,094,177 | Lindenmuth et al. | Sept. 28, 1937 |
| 2,142,082 | Pezzolo | Jan. 3, 1939 |
| 2,400,216 | Smith | May 14, 1946 |

OTHER REFERENCES

Popular Mechanics, June 1915, page 831.